United States Patent [19]
Dressler

[11] Patent Number: 5,461,876
[45] Date of Patent: Oct. 31, 1995

[54] COMBINED AMBIENT-AIR AND EARTH EXCHANGE HEAT PUMP SYSTEM

[76] Inventor: William E. Dressler, 20145 W. 119th St., Olathe, Kans.

[21] Appl. No.: 267,661

[22] Filed: Jun. 29, 1994

[51] Int. Cl.$^6$ .................................................. F25B 27/02
[52] U.S. Cl. ........................... 62/160; 62/196.4; 62/200; 62/238.7; 62/260; 237/2 B
[58] Field of Search ................... 62/160, 238.6, 62/238.1, 238.7, 196.4, 199, 198, 200, 324.1, 324.4, 260, 324.6; 165/45; 237/2 B

[56] References Cited

U.S. PATENT DOCUMENTS

| | | | |
|---|---|---|---|
| 3,782,132 | 1/1974 | Lohoff | 62/260 |
| 4,042,012 | 8/1977 | Perry et al. | 165/1 |
| 4,065,938 | 1/1978 | Jonsson | 62/160 |
| 4,091,636 | 5/1978 | Margen | 62/260 X |
| 4,143,642 | 3/1979 | Beaulieu | 62/238.6 X |
| 4,165,036 | 8/1979 | Meckler | 237/2 B X |
| 4,179,894 | 12/1979 | Hughes | 62/2 |
| 4,299,277 | 11/1981 | McGregor | 62/260 |
| 4,305,260 | 12/1981 | Backlund | 62/238.6 |
| 4,383,419 | 5/1983 | Bottum | 62/238.6 |
| 4,388,966 | 6/1983 | Spiegel | 165/45 |
| 4,409,796 | 10/1983 | Fisher | 62/160 |
| 4,423,602 | 1/1984 | Venable | 62/238.6 |
| 4,493,193 | 1/1985 | Fisher | 62/160 |
| 4,553,401 | 11/1985 | Fisher | 62/160 |
| 4,646,538 | 3/1987 | Blackshaw et al. | 62/238.7 |
| 4,688,717 | 8/1987 | Jungwirth | 237/2 B |
| 4,893,476 | 1/1990 | Bos et al. | 62/79 |
| 4,920,757 | 5/1990 | Gazes et al. | 62/181 |
| 5,025,634 | 6/1991 | Dressler | 62/79 |
| 5,038,580 | 8/1991 | Hart | 62/260 X |
| 5,224,357 | 7/1993 | Galiyano et al. | 62/260 |
| 5,239,838 | 8/1993 | Tressler | 62/324.1 |
| 5,244,037 | 9/1993 | Warnke | 165/45 X |
| 5,388,419 | 2/1995 | Kaye | 62/200 X |

*Primary Examiner*—Harry B. Tanner
*Attorney, Agent, or Firm*—Simmons, Perrine, Albright & Ellwood

[57] ABSTRACT

An improved combined ambient-air and earth exchange heat pump system includes a subterranean heat exchanger and an ambient-air heat exchanger, both refrigerant-based, which are adapted to be selectively operated individually, serially or in parallel for heating and cooling purposes. The system also includes a compressor, a dynamic load heat exchanger, a reversing valve for converting the system from heating to cooling and vice versa, storage for excess refrigerant including an accumulator, an optional preheat exchanger, a regulating assembly with bleed port arrangement, a bypass mechanism for repetitive start-up attempts, and a lost charge device. A control center is provided to automatically activate the ambient-air heat exchanger to assist the subterranean heat exchanger after thermal stressing about the latter, to automatically deactivate the ambient-air heat exchanger for ambient conditions below a preset temperature, to increase or decrease the number of tubes used by the subterranean heat exchanger, and to optionally maintain the flow of refrigerant through the subterranean heat exchanger in the same direction during both the heating mode and the cooling mode.

37 Claims, 2 Drawing Sheets

COMBINED AMBIENT-AIR AND EARTH EXCHANGE HEAT PUMP SYSTEM

BACKGROUND OF THE INVENTION

1. Field of the Invention

The present invention relates to a heating and cooling system for heating an environmental or process load by removing thermal energy from the earth and/or ambient atmosphere and transferring that energy to the load and, similarly, cooling the load by removing thermal energy therefrom and transferring that energy to the earth, and/or ambient atmosphere for dissipation therein.

2. Description of the Related Art

With the steadily increasing costs of fossil and other depletable types of fuels, which are presently being used to obtain desirable temperature levels in environmental and process loads, greater emphasis is being directed toward developing systems and methods to extract energy either from the vast, virtually unlimited thermal energy stored in the earth or from the ambient atmosphere and transferring that energy to the loads for heating purposes and, reversely, extracting thermal energy from the loads and transferring that energy either to the earth or to the ambient atmosphere for dissipation therein for cooling purposes. One type of previous system for accomplishing such objectives is commonly referred to as a heat pump.

Conventional air-source reverse-cycle heat pump systems are commonly used for providing heating and/or cooling to building environmental spaces, manufacturing processes, and a variety of other usages. Properly used, such systems can be quite effective in environments where the ambient temperature is not extreme. Although generally acceptable performance is obtained in such moderate ambient temperature conditions, such systems leave a lot to be desired during extreme fluctuations in ambient temperatures, wherein substantial reductions in heating and cooling capabilities and in operating efficiencies are realized.

Modifications in air-source heat-pump systems have been attempted to enhance performance, such as incorporating additional booster heat exchangers and/or secondary refrigerant loops. Unfortunately, such modifications have provided only minor enhancements at best.

In recent years, heat-pump systems have been developed which use subterranean heat exchangers whereby the earth is utilized as a heat source and/or sink, as appropriate. Heat-pump systems utilizing the more moderate temperature range of the earth provides efficiencies which are substantially improved over those obtained from air-source heat pump systems. Such earth exchange systems are based on the concept that useful thermal energy could be transferred to and from the earth by the use of subterranean tubes in flow communication with various above ground components.

A refrigerant coolant pumped through such tubes by a compressor serves as a carrier to convey thermal energy absorbed from the earth, as a heat source, to the above ground components for further distribution as desired for heating purposes. Similarly, the coolant carries thermal energy from the above ground components through the subterranean tubes for dissipation of heat energy into the earth, as a heat sink, for cooling purposes.

Unfortunately, a major complication may arise when refrigerant is pumped through the subterranean tubes. First, lubricant oil which characteristically escapes from the compressor while the system is operating is carried along with the refrigerant throughout the system. Due to the lower elevation of the subterranean tubes, the lubricant oil tends to accumulate in the tubes. As a result, the accumulation of the lubricant oil in the subterranean tubes gradually floods those tubes, substantially reducing the ability of the subterranean tubes to perform their originally intended function. Further, the compressor may be gradually deprived of essential lubricant oil, which jeopardizes the continued successful operation of the compressor. As a result, various complicated refrigerant distribution configurations have been utilized in an attempt to control the flow of the refrigerant.

Second, when an energy demand cycle was completed, the system would shut down while waiting for a subsequent demand for energy transfer. As a result, a certain amount of liquid refrigerant then passing through the subterranean tubes would lose its momentum and remain in the subterranean tubes. When the subsequent energy demand occurred, the compressor, which was generally designed for pumping gas as opposed to pumping liquid, would quickly deplete the gaseous refrigerant trapped between the liquid refrigerant in the subterranean tubes and the compressor such that a low pressure condition was quickly created at the inlet of the compressor. Most compressors are designed to interpret such a low pressure condition at the inlet as an indication that insufficient refrigerant exists in the system to function properly. As a result, the compressor would automatically shut down when such a low pressure condition was sensed in order to protect against potential burn-out of the compressor from absence of sufficient refrigerant.

A similar but more pronounced low pressure problem was encountered when a reversible system switched from a heating mode to a cooling mode. This problem arose from an imbalance in the refrigerant capacity which is inherent in a reversing system. The imbalance results from the much larger volume capacity of the subterranean heat exchanger as compared to the volume capacity of the dynamic load heat exchanger. When the operating cycle reversed, additional time was required to transfer the excess refrigerant whereby the refrigerant could assume its appropriate redistribution throughout the system in order to properly function in the reverse mode.

During that transfer time period, the previously described low pressure condition was created at the inlet of the compressor. The generally, relatively short time interval allowed for the low pressure condition at the compressor inlet before automatic shutdown was generally insufficient for the compressor to overcome the inertial resistance of the static refrigerant in the subterranean tubes and to redistribute the refrigerant for the reverse mode. Again, the low pressure condition at the compressor inlet generally caused the compressor to automatically shut down prematurely. Such imbalance was particularly troublesome during a system start-up at the end of an extended heating cycle where the temperature of the earth surrounding the subterranean tubes has been reduced as a result of extraction of thermal energy therefrom. As a result, a large volume of refrigerant could accumulate in the tubes of the subterranean heat exchanger.

A third problem, which was generally observed for prior art heat pumps, was the absence of a mechanism for achieving refrigerant pressure equalization subsequent to system shutdown for reducing start-up loads. Because of the absence of such pressure equalization, the service life of the compressor was reduced.

Previous attempts to circumvent some of the aforesaid problems generally followed either of two approaches: (i) using a plurality of closed loop systems working in combination, with one of such loops horizontally or vertically disposed subterraneously, or (ii) using a vertically disposed, single-closed loop, subterranean exchanger.

The plural loop approach generally utilized indirect heat exchange rather than direct heat exchange. That approach basically employed two or more distinct and separate, cooperating, closed loop systems. A first one of such closed loop systems was sequentially routed through the earth and through an interim heat exchanger transferring thermal energy therebetween. The other one of such closed loop systems, which was sequentially routed through the interim heat exchanger and through a dynamic load heat exchanger for further distribution as desired via techniques commonly known in the heating and cooling industry, operably interacted with the first such closed loop system in the interim exchanger. Thus, through the cooperative effort of the two separate closed loop systems, thermal energy was indirectly transferred between the earth and the environmental or process load.

By using a plural loop approach, the oil deprivation problem was partially resolved by eliminating transmission of the refrigerant and oil through the subterranean tubes, thereby minimizing the quantity of oil which could be drained away from the compressor or by using a non-phase-change heat transfer fluid in the subterranean portion of such a plural loop system. Such double closed loop systems were substantially more complicated, due to the greater number of components required, and were considerably less efficient than properly designed, single closed loop systems.

The liquid-based earth-source systems provided improvements over air-source systems by using the earth's thermal mass as a heat source/sink and by eliminating the ambient air as a heat source/sink. On the negative side, the utilization of secondary heat exchange loops for these systems increases the complexity of these systems by requiring the use of extra pumps, extra heat exchangers, heat transfer fluids in addition to a refrigerant, etc. Though more efficient than air-source systems, this added complexity limited the efficiency obtainable from such systems.

The vertical single-closed-loop approach generally utilized downwardly or vertically inclined subterranean tubes. Such a system could generally be designed to operate in either a heating mode or a cooling mode. Unfortunately, however, the same system generally would not properly function when operated in a reverse mode due to the difference in specific density of gaseous refrigerant relative to that of liquid refrigerant. Specifically, while the transition from liquid to gas could be designed to occur while the refrigerant was passing downwardly in one mode of operation, such transition could occur while the refrigerant was passing upwardly in the reverse mode of operation. Another shortcoming of a prior art vertical loop system was the entrapment of oil at the lower extremities of the vertically oriented tube, thereby depriving the compressor of essential lubricant oil.

Solutions to many of the foregoing problems were taught in U.S. Pat. No. 5,025,634, HEATING AND COOLING APPARATUS, issued Jun. 25, 1991 to William E. Dressier, by eliminating the need for a secondary liquid-based subterranean heat exchanger and replacing it with a refrigerant-based subterranean heat exchanger, with consequent improvement in heat-pump performance and reduction in equipment and maintenance costs.

A disadvantage arising from prolonged usage of the earth-source heat-pump systems still remained: stressing of the earth's ability to transfer and/or store large quantities of thermal energy in the vicinity of the heat exchanger for extended periods of time. This situation was generally particularly noticeable for systems used for manufacturing processes or under-sized environmental space conditioning applications.

An attempted solution to the stressing problem included the augmentation of a liquid-source heat pump with a liquid-heat exchanger loop which integrated both a liquid-based subterranean heat exchanger and a liquid-based fan coil in an attempt to boost the performance of the liquid-source heat pump, such as that taught by Margen in U.S. Pat. No. 4,091,636. In that system, only one or the other of the heat exchangers were operated at any one time. Unfortunately, such integrated systems generally failed to realize optimum operational efficiencies. Further, the integrated refrigerant and liquid subsystems produced a system with substantially increased complexity and maintenance requirements.

In another approach, such as that taught by Gazes et al. in U.S. Pat. No. 4,920,757, a third fan coil was integrated with a refrigerant-based subterranean heat pump design. That system, however, did not employ the additional fan coil as an alternative energy source. Instead, it merely used the coil to control excess refrigerant build-up in the subterranean heat exchanger; during one cycle, it worked serially with the indoor-heat exchanger and, during the other cycle, it worked serially with the subterranean heat exchanger.

In yet another approach, as taught by Tressler in U.S. Pat. No. 5,239,838, two separate heat exchange sources were incorporated into a single heat pump system. That system could either be operated as an air-source heat pump or as a liquid-source heat pump attached to a thermal storage tank, which was in turn heated by a water heater or solar panel. The system was designed to perform as an air-source heat pump or, during the heating cycle, to draw thermal energy from the storage tank. Again, that system did not realize optimum operational efficiencies because it did not coordinate concurrent utilization of both energy sources.

In still another approach, as taught by Blackshaw et al. in U.S. Pat. No. 4,646,538, a system incorporated three heat exchangers: a secondary liquid-based subterranean heat exchanger, an indoor fan coil heat exchanger, and a hot-liquid heat exchanger. Although the system could transfer heat between any two of the heat exchangers, the Blackshaw et al. system did not utilize the third heat exchanger to augment the performance of the subterranean heat exchange loop and optimum efficiencies were not fully realized.

What is needed is a combined heat pump system which realizes optimal operational heating and cooling efficiencies by coordinating concurrent utilization of an earth exchanger in conjunction with an ambient-air exchanger.

SUMMARY OF THE INVENTION

An improved heat pump system is provided for optimizing heating and cooling efficiencies by coordinating concurrent utilization of a direct earth or subterranean heat exchanger in conjunction with an ambient-air heat exchanger, both refrigerant-based. The subterranean and ambient-air heat exchangers are adapted to operate from the same refrigerant distribution system, to simultaneously serve as heat sources during the operation of the system in a heating mode, and to simultaneously serve as heat sinks during the operation of the system in a cooling mode. The subterranean and ambient-air heat exchangers may be operated alone, serially or in a parallel arrangement.

The system includes a compressor, which discharges gaseous refrigerant having elevated pressure and temperature to a reversing valve. With the system operating in a heating mode, the refrigerant is then directed to a transient load heat exchanger for process application or environmental purposes. As the refrigerant passes therethrough, it condenses to a liquid having a elevated pressure and moderate temperature. The refrigerant then flows through a flow regulating arrangement, either in the form of a leg having a check valve and a bleeder valve or a bi-directional valve which can also be used for the cooling mode. The refrigerant which exits from the flow regulating arrangement has reduced pressure and temperature.

The refrigerant then enters either the subterranean heat exchanger, the ambient-air heat exchanger, or both depending on whether the subterranean and/or ambient-air heat exchangers are operating alone, serially or in parallel. As the refrigerant traverses the subterranean and/or ambient-air heat exchangers, the refrigerant is converted from a liquid to a gas having reduced pressure and moderate temperature. The gaseous refrigerant emerging from the subterranean and/or the ambient-air heat exchangers is then directed through the reversing valve, through an accumulator, and back into the compressor completing the cycle.

With the system operating in a cooling mode, the gaseous refrigerant discharged by the compressor is directed by the reversing valve to either the subterranean heat exchanger, the ambient-air heat exchanger, or both depending on whether the subterranean and/or ambient-air heat exchangers are operating alone, serially or in parallel. As the refrigerant traverses the subterranean and/or ambient-air heat exchangers, the refrigerant is substantially converted from a gas to a liquid having reduced pressure and moderate temperature.

The liquid refrigerant emerging from the subterranean and/or the ambient-air heat exchangers then flows through the flow regulating arrangement to the transient load heat exchanger for process application or environmental purposes. As the refrigerant passes therethrough, it is substantially converted from a liquid to a gaseous phase. The refrigerant then flows through the reversing valve, the accumulator, and back to the compressor completing the cycle.

If desired, the refrigerant discharged by the compressor may be directed through one or more preheat exchangers. In applications where substantially all of the available thermal energy is dispersed by the preheat exchangers, an optional arrangement may be provided which bypasses the transient load heat exchanger.

The system may include an arrangement whereby the ambient-air heat exchanger may be automatically activated to assist the subterranean heat exchanger.

PRINCIPAL OBJECTS AND ADVANTAGES OF THE INVENTION

The principal objects and advantages of the present invention are: to provide a heating and cooling system wherein a direct earth heat exchanger is used in conjunction with a ambient-air heat exchanger; to provide such a system wherein a refrigerant passes serially through the direct earth heat exchanger and the ambient-air heat exchanger; to provide such a system wherein the direct earth heat exchanger and the ambient-air heat exchanger are connected in parallel; to provide such a system whereby the ambient-air heat exchanger may be automatically activated to assist the subterranean heat exchanger; to provide such a system wherein the need for auxiliary heating equipment is eliminated; to provide such a system wherein defrost cycles are eliminated; and to generally provide such a system which is economical to manufacture, efficient in operation, capable of long operating life and particularly well adapted for the intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

Figure 1:
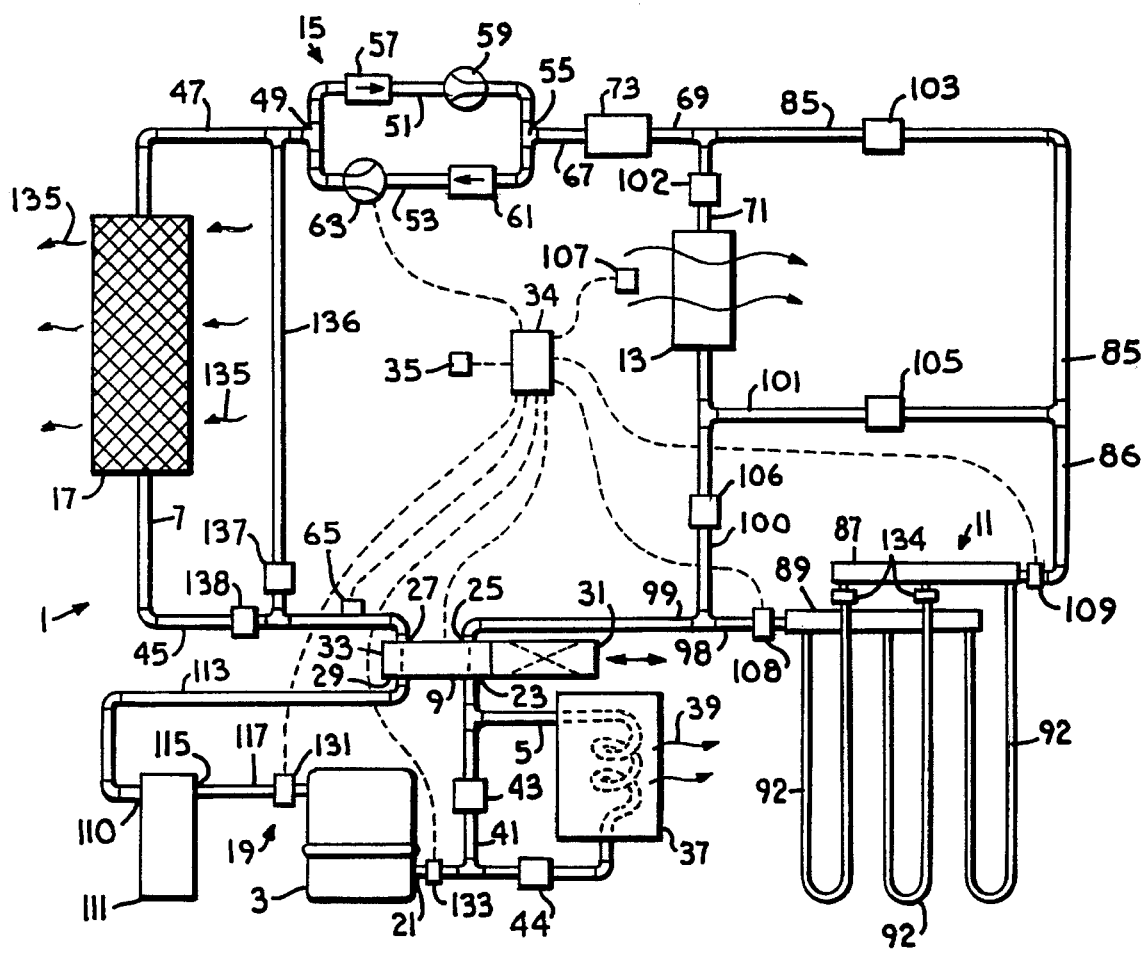
FIG. 1 is a plan view, partially in schematic, of a combined ambient-air and earth exchange heat pump system, according to the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally refers to a combined ambient-air and earth exchange heat pump system in accordance with the present invention, as shown in FIGS. 1 through 10. The system 1 generally comprises a refrigerant pressurizing device 3 such as a compressor, refrigerant 5, distribution system 7, a reversing valve assembly 9, a subterranean heat exchanger 11, an ambient-air heat exchanger 13, a regulating or expansion valving assembly 15, and a dynamic load heat exchanger 17.

The refrigerant pressurizing device 3, such as a Series CR refrigerant compressor or a Scroll series compressor as provided by Copeland Corporation of Rushville, Ind., or the like, is adapted to pressurize and discharge the refrigerant 5 under elevated temperature and pressure into the distribution system 7. The actual capacity of the refrigerant pressurizing device 3 depends upon the heat transfer requirements of a particular application utilizing the present invention. For example, a particular application may require a compressor 3 having a capacity to cycle a minimum of 2.5 pounds of refrigerant per minute for each ton of overall system capacity of the invention 1. The refrigerant pressurizing device 3 has an inlet port 19 and an outlet port 21. The pressure of the refrigerant 5 as it passes through the outlet port 21 generally ranges between 175 and 275 psi; preferably, the pressure ranges between 200 to 250 psi.

The refrigerant distribution system 7, comprising hollow conduit, such as refrigerant tubing or the like, is constructed of copper or other suitable material and provides means for flow communication between the various components of the system 1, as hereinafter described.

The diameter of the conduit 7, which interconnects the various components as herein described into a closed loop, depends on the overall system heating and cooling capacity needed for a particular application. For example, for an application requiring a system having a capacity of one to five tons, the diameter of the conduit 7 which conveys the refrigerant 5 substantially in a liquid phase typically ranges in size between approximately ⅜ to ½ inch outside diameter, the actual size for a particular application of the apparatus being dependent upon the overall capacity of the system 1. Similarly, the diameter of the conduit 7 which conveys the refrigerant 5 substantially in a gaseous phase typically ranges in size between approximately ⅞ and 1⅛ inches outside diameter.

The reversing valve assembly 9 has an inlet port 23, an energy reservoir port 25, a load device port 27, and an outlet port 29. The valve assembly 9, such as a Series 401RD four-way reversing valve as provided by Emerson Electric Co., Alco Controls Division of St. Louis, Mo., or the like, has two basic configurations as shown in FIG. 1: (1) a heating mode configuration 31, wherein the inlet port 23 is connected in flow communication with the load device port 27 and the outlet port 29 is connected in flow communication with the energy reservoir port 25, and (2) a cooling mode configuration 33, wherein the inlet port 23 is connected in flow communication with the energy reservoir port 25 and the outlet port 29 is connected in flow communication with the load device port 27. Switching of the reversing valve assembly 9 from either of the configurations 31 or 33 to the other is electrically controlled by an outlet from a control center 34, which includes a temperature sensing device 35 such as a thermostat as provided by Emerson Electric Co., White-Rogers Division of St. Louis, Mo., or the like.

The refrigerant 5 flowing from the compressor 3 to the reversing valving assembly 9 may be routed through an optional preheat exchanger 37, such as a Model DYNAMAX by American Equipment Systems Corp. of Oldsmar, Fla., to remove super-heat from the refrigerant 5. A receiving medium 39, such as water or another suitable medium, is circulated through the exchanger 37. The temperature of the refrigerant 5 in the exchanger 37 is warmer than the temperature of the medium 39 such that a temperature gradient exists therebetween. As a result, some of the thermal energy contained in the refrigerant 5 is transferred to the medium 39, which is then transported elsewhere for further application. The rate of transfer of thermal energy from the refrigerant 5 to the medium 39 is controlled such that the refrigerant 5 leaving the heat exchanger 37 is still substantially in a gaseous phase at an elevated temperature.

It is foreseen that a plurality of such preheat exchangers 37, either in flow communication in parallel or serially, could be integrated into the system 1 in accordance with the present invention. Alternatively, the distribution system 7 may include a bypass conduit 41, controlled by opening a valve 43 and closing a valve 44, whereby the refrigerant 5 may be diverted around the exchanger 37, such as when the system 1 is being used in the heating mode 31. If the total capacity of the preheat exchanger(s) 37 should approximate the total capacity of the system 1, then the system 1 preferably includes a bypass loop 136 with associated valves 137 and 138. Then, in the event that substantially all of the thermal energy provided by the system 1 be transferred to the media 39 by the preheat exchanger(s) 37, the valve 138 is closed and the valve 137 is opened such that the refrigerant 5 bypasses the dynamic load heat exchanger 17. For some applications, the heat exchanger 37 may not be desired, and may be eliminated from the system 1.

The dynamic load heat exchanger 17, such as a Series TWV heat pump blower unit as provided by Trane Company, Dealer Products of Tyler, Tex. or the like for environmental loads, or a Series MPX heat exchanger as provided by Carrier Corporation of Syracuse, N.Y. or the like for process loads, is connected in flow communication with the load device port 27 by conduit 45 of the distribution system 7. The refrigerant 5 in the conduit 45 is in a gaseous phase and the diameter of the conduit 45 will depend on the overall capacity of the system 1. For example, for applications of the system 1 having a heating and cooling capacity of three tons, a suitable diameter for the conduit 45 is ⅞ inch.

The refrigerant 5 may undergo a phase change in the dynamic load heat exchanger 17 as hereinafter described. As a result, the refrigerant 5 in the conduit 47 is in a liquid phase. Again, the diameter of the conduit 47 depends on the overall system capacity for a particular application. For example, the conduit 47 for an application requiring a system having a heating and cooling capacity of one to three tons has a diameter of approximately 3/8 inch. The diameters of other conduits in the system 1 conveying the refrigerant 7 in a liquid phase will typically be sized similarly to that of the conduit 47. The refrigerant 5 as it exits from the dynamic load heat exchanger 17 has an elevated pressure and a moderate temperature.

The conduit 47 connects the dynamic load exchanger 17 in flow communication with a tee 49 of the expansion valving assembly 15. The tee 49 serves as an inlet for a heating mode branch or leg 51 of the expansion valving assembly 15 and as an outlet for a cooling mode branch or leg 53 of the expansion valving assembly 15. Besides the connections at the tee 49, the legs 51 and 53 also converge at a tee 55, which serves as an outlet for the heating mode leg 51 and as an inlet for the cooling mode leg 53.

The heating mode leg 51 comprises a check valve 57 and a heating mode refrigerant expansion or flow regulating device 59. The check valve 57 and the regulating device 59 are connected serially. The check valve 57 controls the direction of flow of the refrigerant 5 through the heating mode leg 51; the refrigerant 5 is permitted to flow rightwardly through leg 51 as shown in FIG. 1 but is prevented from flowing rightwardly through the cooling mode leg 53 by a check valve 61. An example of the check valve 57 is a Magna Check as provided by Watsco of Hialeah, Fla.

The regulating device 59 regulates, modulates and controls the rate of flow of refrigerant 5 therethrough, based on the pressure differential of the refrigerant 5 across the regulating device 59, which is dependent of the pressure of the refrigerant 5 immediately downstream therefrom. The operable downstream pressure of the refrigerant 5 generally ranges in pressure from 30 to 90 psi, preferably 50–70 psi. The regulating device 59 has a bleed port, preferably 20–25%, which allows pressure across the device 59 to equalize during each off-cycle of the system 1. Such pressure equalization permits unloaded and efficient system start-up in the heating mode and during system reversal from one mode to the other as hereinafter described, which thereby extends the service life of the refrigerant compression device 3.

The cooling leg 53 comprises the check valve 61 and a cooling mode refrigerant flow regulating device 63 connected serially. Similarly to the arrangement for the heating mode leg 51, the check valve 61 controls and modulates the direction of flow of the refrigerant 5 through the cooling mode leg 53. The refrigerant 5 is permitted to flow leftwardly (as shown in FIG. 1) through the cooling mode leg 53 but is prevented from flowing leftwardly through the heating mode leg 51 by the check valve 57. The regulating device 63 has a bleed port, preferably 20–25%, for an unloaded and efficient start-up of the refrigerant compression device 3 in the cooling mode and during system reversal, which thereby extends the service life of the refrigerant compression device 3.

A monitoring device 65 in communication with the regulating device 63 is attached to the conduit 45 for monitoring the temperature and/or pressure of the refrigerant 5 in the conduit 45 as the refrigerant 5 leaves the exchanger 17 during the cooling mode of the system 1. The device 65, in turn, controls the regulating device 63 in order to regulate the flow of the refrigerant 5 through the regulating device 63 such that a particular super-heat condition of the refrigerant 5 as it leaves the exchanger 17 is maintained. Operably, the super-heat temperature condition of the refrigerant 5 should range between 7° F. to 12° F., with a super-heat temperature of 9° F. to 10° F. being preferred.

Alternatively, it may be desirable to replace the expansion valving assembly 15 with an automated bi-directional regulating device, thereby eliminating the need for the separate heating and cooling mode legs 51 and 53 and their associated valves 57, 59, 61 and 63. Such an automated bi-directional valve would be controlled by the control center 34 and provide substantially the same benefits as the valving assembly 15 as taught herein.

The tee 55 is selectively connected in flow communication with the ambient-air heat exchanger 13 through conduits 67, 69, and 71. An optional receiver device 73 may be interposed between the valving assembly 15 and the ambient-air heat exchanger 17, as shown in FIG. 1, as indicated by the numeral 74 in FIG. 2. The receiver device 73 is designed to store excess liquid refrigerant 5 during the heating cycle of the system 1. Some of the lubricating oil which has escaped from the compressor 3 is trapped in the receiver device 73 and, due to its greater specific gravity settles to the bottom thereof, as indicated by the numeral 75 in FIG. 2. If desired, the receiver device 73 may include a baffle 77 adapted to minimize turbulence in the lubricant oil 75 created by the refrigerant 5 flowing through the receiver device 73.

Figure 2:
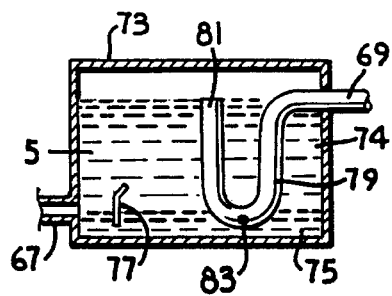
FIG. 2 is an enlarged and fragmentary, vertical cross-sectional view of a receiver device of the combined ambient-air and earth exchange heat pump system.

A U-shaped tube 79 having an open end 81 and a small orifice 83 near the bottom of the radius of the "U", as shown in FIG. 2, is disposed within the receiver device 73. The capacity of the receiver device 73 and the spacing of the end 81 within the device 73 are adapted such that the receiver device 73 serves as a storage container for the excess refrigerant 74 during the heating cycle of the system 1. For example, the receiver device 73 may be adapted to store approximately 20% of the total quantity of refrigerant 5 in the system 1, or other quantity as appropriate for a particular application.

The orifice 83 is adapted to allow the oil 75 to leak into the tube 79. As the excess liquid refrigerant 74 passes into the end 81 and exits the receiver device 73 through the tube 79, the oil 75 which has leaked into the tube 79 is carried along with the refrigerant 74. For some applications, the receiver device 73 may not be required and, therefore, may be eliminated.

The valving assembly 15 is also connected in flow communication with the subterranean heat exchanger 11 through conduits 67, 69, 85 and 86, as indicated in FIG. 1. The subterranean exchanger 11 generally comprises a pair of manifolds 87 and 89 and subterranean heat transfer means in thermal communication with the earth, such as a single field tube 91, as illustrated in various configurations in FIGS. 4 through 9, or as a plurality of field tubes 92, as illustrated in FIG. 1.

The dimensions of the length and diameter of the tubes 91 or 92 are adapted to simultaneously satisfy a multiplicity of requirements. First, the length and diameter of the tubes 91 or 92 must be sized whereby the refrigerant 5 substantially undergoes a nearly complete phase change while passing through the tubes 91 or 92. The extreme seasonal conditions of the earth surrounding the subterranean exchanger must be taken into consideration to assure that sufficient heat transfer capability is available to permit sufficient heat transfer between the refrigerant 5 passing through the tubes and the earth embedding the tubes 91 or 92.

The actual length of the tubes 91 or 92 is generally determined as follows: if the system 1 is being used in the heating mode whereby the refrigerant 5, as a liquid, is introduced into the subterranean exchanger 11 through the manifold 87, substantially 100% of the refrigerant 5 should be converted to a gaseous phase by the time it reaches the manifold 89. Similarly, if the system 1 is being used in the cooling mode whereby the refrigerant 5, as a gas, is introduced into the subterranean exchanger 11 through the manifold 89, substantially 100% of the refrigerant 5 should be condensed to a liquid phase by the time it reaches the manifold 87. (The complete change of phase of the refrigerant 5 while passing through the tubes 91 or 92 is commonly referred to in the industry as 100% flashby.)

At the same time, the diameter of the tubes 91 or 92 is sized within certain limits, based on the overall capacity of the system 1 for a particular application, to assure that the refrigerant 5 will pass through the tubes 91 or 92 with sufficient velocity to operationally sweep the lubricant oil 75, which has escaped from the refrigerant compression device 3, along with the refrigerant 5, even during periods when the oil 75 may exhibit higher viscosity characteristics, such as after a prolonged heating season when the temperature of the earth surrounding the subterranean heat exchanger 11 has dropped as a result of extraction of thermal energy by the system 1. The mass flow rate of the refrigerant 5 through the tubes 91 or 92 which is sufficient to sweep the lubricant oil 75 along with the refrigerant 5, is preferably at least 2½ pounds per minute of refrigerant 5 through each of the tubes 91 or 92, more preferably at least three pounds per minute. When using R22 standard freon as the refrigerant 5, a preferable velocity of the refrigerant 5 as it flows through the tubes 91 or 92 is preferably at least 25 feet/minute, more preferably at least 35 feet/minute.

The actual number of tubes 92 comprising the subterranean heat exchanger 11 required to satisfy the various objectives is dependent upon the capacity needed for a particular application of the present invention. Preferably, the heating and cooling system 1 has at least one of the tubes 91 or 92 for each 12,000 BTU of overall system capacity. For example, an application of the present invention having a heating and cooling capacity of three tons generally requires three copper tubes, each having an outside diameter of ½–⅝ inch and a length of 200 feet. Alternatively, a system 1 with a capacity of three tons can be provided using six of the tubes 92, each having a length of 100 feet and a diameter of ⅜-inch.

Figure 4:
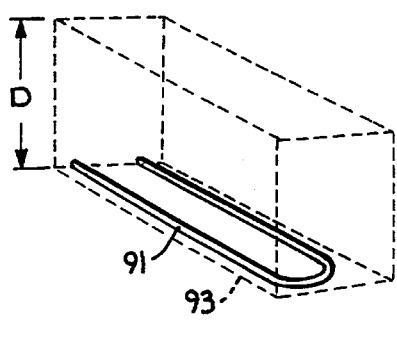
FIG. 4 is a fragmentary, perspective view of a subterranean heat exchanger of the combined ambient-air and earth exchange heat pump system, showing the exchanger in a simple, horizontally planar configuration in solid lines and a trench therefor in dotted lines.
Figure 5:
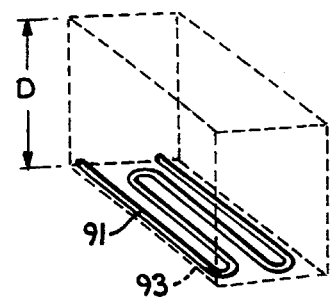
FIG. 5 is a fragmentary, perspective view of the subterranean heat exchanger of the combined ambient-air and earth exchange heat pump system, showing the exchanger in a lengthwise folded, horizontally planar configuration in solid lines and the trench therefor in dotted lines.
Figure 6:
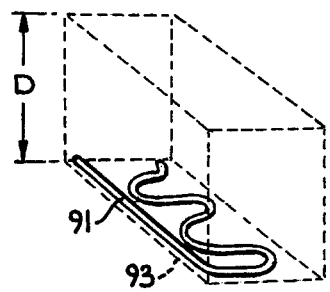
FIG. 6 is a fragmentary, perspective view of the subterranean heat exchanger of the combined ambient-air and earth exchange heat pump system, showing the exchanger in a crosswise folded, horizontally planar configuration in solid lines and the trench therefor in dotted lines.

The configuration for a particular application must be selected such that sufficient refrigerant velocity is maintained to insure continued oil circulation throughout the system 1. As indicated in FIGS. 4–9, the tubes 91 or 92 may have any orientation, including horizontally and vertically. FIG. 4 illustrates the simplistic approach of installing the tubes 91 or 92 out and back in a trench 93 with the appropriate minimum recommended spacing between different segments thereof as herein described. FIGS. 5 and 6 illustrate horizontal configurations which utilize a shorter but wider footprint than that required for the configuration shown in FIG. 4.

Figure 9:
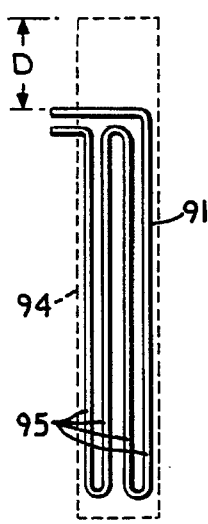
FIG. 9 is a reduced and fragmentary, side view of the subterranean heat exchanger of the combined ambient-air and earth exchange heat pump system, showing the exchanger in a lengthwise folded substantially vertically oriented configuration in solid lines and the bore hole therefor in dotted lines, according to the present invention.
Figure 8:
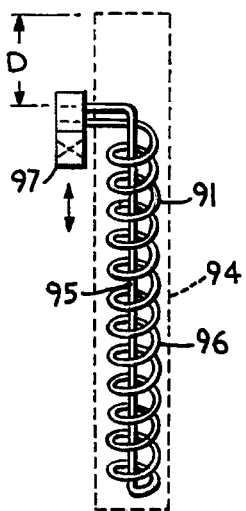
FIG. 8 is a reduced and fragmentary, schematic side view of the subterranean heat exchanger of the combined ambient-air and earth exchange heat pump system, showing the exchanger in a spiralled, substantially vertically oriented configuration in solid lines and a bore hole therefor in dotted lines.
Figure 7:
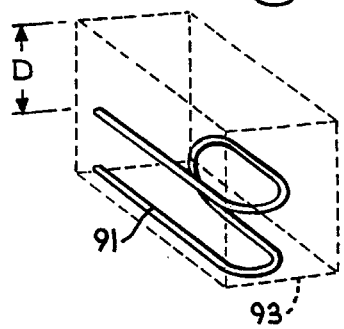
FIG. 7 is a fragmentary, perspective view of the subterranean heat exchanger of the combined ambient-air and earth exchange heat pump system, showing the exchanger in a 3-dimensional, substantially horizontally oriented configuration in solid lines and the trench therefor in dotted lines.
Figure 11:
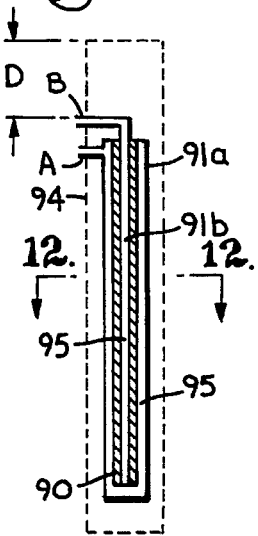
FIG. 11 is a reduced and fragmentary side view of the subterranean heat exchanger of the combined ambient-air and earth exchange heat pump system, showing the exchanger in a lengthwise tube within a tube in a substantially vertically oriented configuration in solid lines and the bore hole therefor in dotted lines, according to the present invention.
Figure 10:
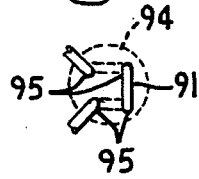
FIG. 10 is a reduced and fragmentary, top view of the subterranean heat exchanger of the combined ambient-air and earth exchange heat pump system, corresponding to the configuration shown schematically in FIG. 9.

FIGS. 7, 8, 9 and 11 illustrate three-dimensional configurations, wherein the configuration shown in FIG. 7 is substantially horizontally oriented. The configurations shown in FIGS. 8, 9 and 11 are substantially vertically oriented. An advantage of the configurations show in FIGS. 8, 9 and 11 is that each of the tubes 91 therefor can be installed in a respective bore hole 94. A further advantage of the configurations shown in FIGS. 8, 9 and 11 is that the tube 91 can be installed partially or entirely below the earth's water table, if desired.

Figure 12:
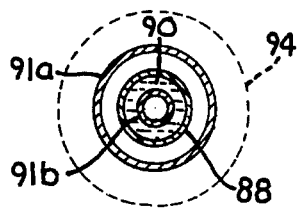
FIG. 12 is an enlarged, cross-sectional view of a subterranean heat exchanger of the combined ambient-air and earth exchange heat pump system, taken generally along the line 12—12 of FIG. 11.

The configuration shown in FIG. 11 includes a pair of concentric tubes 91a and 91b, separated by an insulating sleeve 90 to minimize or prevent thermal migration therebetween. The sleeve 90 may be constructed of rubber, foam or other suitable insulating material. If the sleeve 90 must be protected from the refrigerant 5, then the sleeve may be encapsulated in a surrounding tube 88, as shown in FIG. 12. Additionally, the insulating sleeve 90 may comprise a vacuum or other arrangement which thermally isolates the space between the tubes 88 and 91a from the space contained within the tube 91b. Preferably, the refrigerant 5 in system 1 using the configuration shown in FIG. 11 enters the subterranean heat exchanger 11 through port A and exits from the subterranean heat exchanger 11 through port B, which can be accomplished with a suitable arrangement, such as the reversing valve 97 as shown in FIG. 8.

For applications where the velocity of the refrigerant 5 through the tube 91 is incapable of sweeping the lubricant oil 75 vertically, such as upwardly in a vertical segment 95 of the tube 91 as shown in FIG. 8 but is capable of sweeping the oil 75 along an incline, such as a spiral 96 as shown in FIG. 8, an optional reversing valve 97, similar to the reversing valve assembly 9, may be installed such that the refrigerant 5 always enters into the vertical segment 95 and always exits from the incline segment 96 regardless of whether the system 1 is operating in the heating mode or the cooling mode. The configuration shown in FIG. 9 can be used in those applications where the velocity of the refrigerant 5 is sufficient to sweep the oil 75 up the vertical segments 95 in both the heating and cooling modes, as shown in FIG. 9, or where accumulation of the oil 75 is otherwise not a problem.

The manifolds 87 and 89 and the tubes 91 and 92 are constructed of copper or other suitable material. The manifolds 87 and 89 and the various segments of the field tubes 91 as herein described are sufficiently spaced apart to minimize thermal short-circuiting therebetween. For example, the vertical segments 95 of the configuration shown in FIG. 9 may be spaced apart as shown in plan view in FIG. 10. The diameters of the manifolds 87 and 89 depend on the overall capacity of the system 1 for a particular application. Preferably, each manifold 87 and 89 has a diameter of not less than a size determined by the equation:

$$\text{diameter (in.)} \geq \tfrac{1}{2} + (\tfrac{1}{16} \text{ times tons of system capacity})$$

For example, for a system 1 having a capacity of four tons, the manifolds 87 and 89 each have a diameter of approximately ¾ inch.

One end of each of the tubes 91 is rigidly secured to and in flow communication with the manifold 87 while the other end of each of the tubes 91 is rigidly secured to and in flow communication with the manifold 89. In order to distribute the flow of the refrigerant 5 substantially equally through the tubes 92 when the system 1 has a plurality of the tubes 92, as shown in FIG. 1, all of the tubes 92 have substantially equal diameters and substantially equal lengths. To further insure even distribution of the refrigerant 5 through the tubes 92, the manifolds 87 and 89 generally incorporate a reverse return configuration, i.e., a "first-in/last-out" arrangement of the tubes 92.

The various segments of each of the tubes 91 or 92 are preferably spaced a minimum of 24 inches, more preferably 36–48 inches, from other remote segments of that tube 91 and 92 and from others of the tubes 92, if more than one. The manifolds 87 and 89 and the tubes 91 and 92 are generally installed a minimum of one to two feet below the design frost line normally observed for the locality of a particular installation. For example, the upper extremities of the tubes 91 and 92 of subterranean exchanger 11 would be buried in the trench 93 or the bore hole 94 a minimum of four to five feet below the surface of the earth in the Kansas City, Mo. area, as indicated by "D" in FIGS. 4–9. Preferably, the tubes 91 and 92 are not encapsulated in order to avoid imposing unnecessary thermal barriers between the refrigerant 5 in the tubes 91 and 92 and the earth thereabout.

The subterranean heat exchanger 11 is connected in flow communication with the energy reservoir port 25 through conduits 98 and 99, as shown in FIG. 1. Similarly, the ambient-air heat exchanger 13 is connected in flow communication with the energy reservoir port 25 through conduits 99 and 100.

In addition, conduit 101 interconnects conduits 85 and 86 with conduit 100 such that the subterranean heat exchanger 11 and the ambient-air heat exchanger 13 can be selectively operated individually, serially, or in parallel by appropriate use of valves 102, 103, 105 and 106. If the subterranean heat exchanger 11 is to be operated alone without the ambient-air heat exchanger 13, such as when ambient air conditions are unfavorable for effective heat transfer or when the subterranean heat exchanger 11 can provide the necessary heat transfer without assistance from the ambient-air heat exchanger 13, the valves 102 and 105 are closed and the valve 103 is opened. As a result, the refrigerant 5 then flows through the conduits 85, 86, 98 and 99 and the subterranean heat exchanger 11, but is prevented from flowing through the conduit 71 and the ambient-air heat exchanger 13. As the refrigerant 5 flows through the subterranean heat exchanger 11, thermal energy is transferred between the refrigerant 5 and the earth's mass, whereby the refrigerant 5 is converted to a gaseous phase at low pressure and moderate temperature.

Similarly, if the ambient-air heat exchanger 13 is to be operated alone without assistance from the subterranean heat exchanger 11, the valves 102 and 106 are opened and the valves 103 and 105 are closed. As a result, the refrigerant 5 then flows through the conduits 71 and 100 and the ambient-air heat exchanger 13, but is prevented from flowing through the conduits 85 and 86 and the subterranean heat exchanger 11. As the refrigerant 5 flows through the ambient-air heat exchanger 13, thermal energy is transferred between the refrigerant 5 and the ambient air mass, whereby the refrigerant 5 is similarly converted to a gaseous phase at low pressure and moderate temperature.

If the subterranean heat exchanger 11 and the ambient-air heat exchanger 13 are to be operated jointly in a parallel configuration, such as when the system 1 is subjected to heavy process or environmental space conditioning loads in climatic regions where extreme ambient conditions are prevalent or where thermal storage or resources are locally stressed in the proximity of the tubes 91 or 92 due to prolonged thermal energy transfer demands, the valves 102, 103 and 106 are opened and the valve 105 is closed. As a result, the refrigerant 5 then flows through the conduits 85 and 86 and the subterranean heat exchanger 11 at the same time that the refrigerant 5 is also flowing through the conduits 71 and 100 and the ambient-air heat exchanger 13.

If the subterranean heat exchanger 11 and the ambient-air heat exchanger are to be operated jointly in a serial configuration, the valves 102 and 105 are opened and the valves 103 and 106 are closed. As a result, the refrigerant 5 then flows through the conduits 71, 101 and 86, the ambient-air heat exchanger 13 and the subterranean heat exchanger 11, but is prevented from flowing through the conduits 85 and 100.

It is to be understood that the locations of the subterranean heat exchanger 11 and the ambient-air heat exchanger 13 in the distribution system 7 can be reversed from that indicated in FIG. 1 such that the refrigerant 5 flows through the subterranean heat exchanger 13 before it flows through the ambient-air heat exchanger when the system 1 is operated in a serial arrangement. It is to be further understood that additional piping and valve connections can be included in the distribution system 7, by methods commonly known in the art, whereby the refrigerant 5 can be selectively routed, serially, through either of the exchangers 11 and 13, followed by routing through the other of the exchangers 13 or 11.

For purposes of clarity, connections between the valves 43, 44, 97, 102, 103, 105, 106, 134, 137 and 138 and the control center 34 are not shown in the Figures. It is to be understood, however, that each of those values can be selected for their desired performance and controlled by the control center 34 by methods commonly known in the art.

One of the advantages of the present invention wherein the subterranean heat exchanger 11 and the ambient-air heat exchanger 13 are adapted to function jointly and cooperatively as heat sources as the system 1 operates in the heating mode, or as heat sinks as the system 1 operates in the cooling mode, is described as follows. The capacity of the subterranean heat exchanger 11 can be designed to handle a thermal energy demand which is nominally larger than that normally experienced during the early part of the heating and cooling seasons.

As the heating and/or cooling season progresses, the earth about the tubes 91 or 92 of the subterranean heat exchanger 11 may become sufficiently thermally stressed that the subterranean heat exchanger 11 is no longer capable of completely converting the refrigerant 5 for the liquid phase to the gaseous phase as the refrigerant 5 traverses the tubes 91 and 92. In that event, the ambient-air heat exchanger 13 may be activated to assist the subterranean heat exchanger 11 to make up for the loss in efficiency of the subterranean heat exchanger 11 resulting from the thermal stressing about the tubes 91 or 92. For this type of application, the capacity of the ambient-air heat exchanger 13 would be sized to provide for the loss of efficiency of the subterranean heat exchanger 11 which is anticipated by the end of a prolonged heating or cooling season.

Activation of the ambient-air heat exchanger 13 during operation of the system 1 in the heating mode may be accomplished by insertion of a reduced efficiency detection device 108 in the conduit 98. The detection device 108 may be a sensing device adapted to monitor the temperature of the refrigerant 5 as it exits the subterranean heat exchanger 11, an electronic sight glass, or other suitable arrangement. The output from the detection device 108 may then be communicated to the control center 34 which, in turn, may be adapted to automatically open or close the valves 102, 103, 105 and 106 as appropriate.

Similarly, activation of the ambient-air heat exchanger 13 during operation of the system 1 in the cooling mode may be accomplished by insertion of a reduced efficiency detection device 109 in the conduit 86. The detection device 109 in conjunction with the control center 34 can then automatically activate the ambient-air heat exchanger 13 as needed in order to overcome the loss of efficiency arising from thermal stressing during the cooling season.

Further, for those situations where the ambient-air heat exchanger 13 provides sufficient capacity to handle the thermal energy transfer demand without assistance form the subterranean heat exchanger 11, the control center 34 can be adapted to open or close the valves 102, 103, 105 and 106 as appropriate to satisfy that objective. A temperature sensing device 107, which monitors the temperature of the ambient air about the ambient-air heat exchanger 13 can be connected in communication with the control center 34. As a result, if the ambient temperature falls below a particular temperature, usually in the range of 36°–40° F. depending on the relative humidity of the ambient air and in order to avoid frosting of the coils of the ambient-air heat exchanger 13, the control center 34 opens or closes the valves 102, 103, 105 and 106 as appropriate to automatically deactivate the ambient-air heat exchanger 13 and to automatically activate the subterranean heat exchanger 11.

The outlet port 29 of the reversing valve assembly 9 is connected in flow communication with an inlet port 110 of a refrigerant storage device 111, such as an accumulator, through conduit 113. An outlet 115 of the accumulator 111 is, in turn, connected in flow communication with the inlet port 19 of the compressor 3 through conduit 117.

Figure 3:
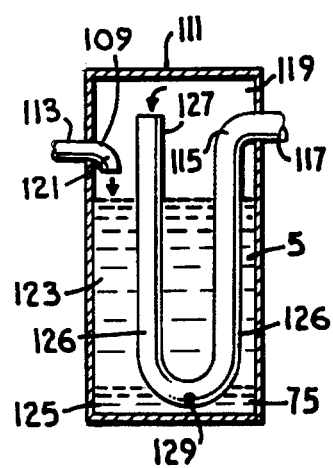
FIG. 3 is an enlarged and fragmentary, vertical cross-sectional view of an accumulator device of the combined ambient-air and earth exchange heat pump system.

The inlet port 109 opens into an upper portion of a cavity 119 contained within the refrigerant storage device 111. A distal end 121 of the inlet port 109 is directed downwardly, as shown in FIG. 3.

The refrigerant storage device 111 is sized to operably store at least 50% of the total volume of refrigerant 5 contained in the system 1. Total mass of the refrigerant 5 in the system 1 will vary as the sizes and lengths of the various components and conduits in the system 1 vary. For example, the refrigerant storage device 111 for a three-ton system is adapted to store at least 7 pounds of the refrigerant 5 therein. The approximate minimum total mass of the refrigerant 5 required for the system 1 to properly function is determinable from the equation:

total system refrigerant capacity (lbs.)≈8+(2 times tons of system capacity)

The storage device 111 is adapted such that any of the refrigerant 5 which enters the refrigerant storage device 111 in a liquid phase immediately joins the other liquid refrigerant 5 in a refrigerant reservoir 123 contained therein. The lubricant oil 75, which is carried along with the refrigerant 5 into the refrigerant storage device 111, has a specific density which is greater than the specific density of the liquid refrigerant 5. As a result, the oil 75 promptly settles to the bottom of the refrigerant storage device 111 to form an oil reservoir 125, as illustrated in FIG. 3.

The outlet 115 of the refrigerant storage device 111 extends substantially internally as a "U" tube 126 with a distal end 127 thereof turned upright, as illustrated in FIG. 3. The distal end 127 opens into the upper portion of the cavity 119 above the liquid refrigerant reservoir 123 where the gaseous refrigerant 5 accumulates.

An orifice 129 is spaced near the bottom of the radius of the "U" tube 126, internally to the refrigerant storage device 111, whereat the lubricant oil 75 can be actively and operably removed from the refrigerant storage device 111 and returned to the refrigerant compression device 3 along with the refrigerant 5 removed from the refrigerant storage device 111 through the outlet 115.

A low pressure bypass mechanism 131 monitors the pressure of the refrigerant 5 contained in the conduit 117. The bypass mechanism 131 prolongs the permissible duration of time during start-up or reversal of the system 1 to avoid premature shutdown of the system 1. For example, in a system having a three-ton heating and cooling capacity, the bypass mechanism 131 anticipates and compensates for the aforedescribed low input pressure conditions for a pre-set period of time before shutting down. After a pre-set period of delay, the bypass mechanism 131 again anticipates another on-cycle in an attempt to start-up or reverse the system 1 before again shutting down for the pre-set period of delay, etc. As an additional safeguard, a lost charge device 133 situated near the outlet port 21 of the compressor 3, as shown in FIG. 1, is adapted to detect loss of the charge of the refrigerant 5 in the system 1 and, in that event, to override the bypass mechanism 131 and to terminate operation of the system 1.

A further modification to the system 1 may include the insertion of a shutoff valve 134 in one or more of the tubes 92, as shown in FIG. 1. By connecting the shutoff valves 134 in communication with the control center 34, one or more of the valves 134 may be opened to increase the capacity of the subterranean heat exchanger 11, or closed to decrease the capacity of the subterranean heat exchanger 11 and/or to increase the mass and velocity of the refrigerant 5 flowing through the tubes 92 which remain open.

In use, the system 1 may be operated in either a cooling mode or a heating mode, but the system 1 cannot be operated in both the heating mode and the cooling mode simultaneously. When the temperature sensing device 35 signals a demand for heat, the system 1 enters the heating mode with the reversing valve assembly 9 assuming the heating configuration 33. The refrigerant pressurizing device 3 activates and begins pumping gaseous refrigerant 5 from the cavity 119 of the refrigerant storage device 111.

If the lubricant 75 is present in the oil reservoir 125, the oil 75 is drawn through the orifice 129 and returned to the refrigerant compression device 3 to replenish the oil 75 which had temporarily escaped from the refrigerant compression device 3. If the level of the oil reservoir 125 is too low to be accessed by the orifice 129, then liquid refrigerant 5 only will be drawn through the orifice 129 from the liquid refrigerant reservoir 123 and carried into the refrigerant compression device 3 along with the gaseous refrigerant 5 from the cavity 119. Although the refrigerant compression device 3 is generally designed to pump only refrigerant 5 in its gaseous phase rather than in its liquid phase, the volume of liquid refrigerant 5 actually drawn into the refrigerant compression device 3 is minimal and harmless and, for the most part, flashes before the actual compression cycle.

When the refrigerant 5 is expelled from the refrigerant compression device 3, the refrigerant 5 generally has a temperature of approximately 130° F. to 180° F. and a pressure of approximately 200 to 250 psi. After passing through the reversing valve assembly 9 during the heating mode of the system 1, the refrigerant 5 is directed into the dynamic load heat exchanger 17.

A receiving medium, such as air as referenced by the number 135 in FIG. 1, is simultaneously circulated through and is in thermal communication with the exchanger 17. The refrigerant 5 passing through the exchanger 17 has a temperature which is elevated above the temperature of the receiving medium 135. As a result, the receiving medium 135 extracts heat energy from the refrigerant 5 passing through the dynamic load heat exchanger 17, with the medium 135 containing its newly acquired thermal energy then ducted or otherwise transported away from the exchanger 17 and distributed as desired.

As a result of surrendering some of its thermal energy to the conductive medium 135, the refrigerant 5 condenses while passing through the exchanger 17 and exits the exchanger 17 in a liquid phase. The liquid refrigerant 5 then passes through the check valve 57 and through the regulating device 59 where the flow rate of the refrigerant 5 is controllably regulated while it simultaneously undergoes a drop in pressure. The magnitude of the drop in pressure is selected whereby the temperature of the refrigerant 5 as it leaves the valving assembly 15 is substantially below the temperature of the earth below the frost-line of the locality and/or the temperature of the air surrounding the ambient-air heat exchanger 13.

The liquid refrigerant 5 is then selectively routed into the subterranean heat exchanger 11 or the ambient-air heat exchanger 13—alone, serially, or in parallel. The pressure of the refrigerant 5 exits the exchangers 11 and 13 during the heating mode configuration between 30 to 90 psi, preferably between 50 to 70 psi.

The magnitude of the mass of the refrigerant 5 flowing through the tubes 91 or 92 should be sufficient to sweep, along with the refrigerant 7, any of the lubricant 75 oil which might otherwise tend to accumulate in the subterranean heat exchanger 11.

As the refrigerant 5 traverses the exchangers 11 and 13 during the heating mode of the system 1, the refrigerant 5 absorbs heat energy from the earth and/or the ambient air, causing the refrigerant 5 to undergo a phase change from liquid to gas.

As the heating season continues, however, the earth surrounding the embedded subterranean heat exchanger 11 will cool down, reducing the temperature gradient between the immediately surrounding earth and the refrigerant 5 in the tubes 91 or 92. As a result, the subterranean heat exchanger 11 loses some of its ability to transfer heat energy from the earth to the refrigerant 5 traversing the tubes 91. Thus, without the assistance of the ambient-air heat exchanger 13, some of the refrigerant 5 which enters the subterranean heat exchanger 11 in the liquid phase would also exit the subterranean heat exchanger 11 as a liquid due to an incomplete phasal transition from liquid to gas therein. Thus, the contribution provided by the ambient-air heat exchanger 13, to assure that substantially all of the refrigerant 5 is converted into a gas during each cycle of the system 1 while in the heating mode, becomes more and more essential as the heating season progresses and the temperature of the ground immediately surrounding the tubes 91 or 92 is reduced.

The refrigerant 5 is then routed through the reversing valve assembly 9 and into the refrigerant storage device 111 to complete the circuit of refrigerant 5 through the system 1 during the heating mode thereof. Pressure of the refrigerant 5 entering the refrigerant storage device 111 generally ranges from 30 to 90 psi. When the heating demand which initiated the heating cycle has been satisfied, as signalled by the control center 34, the refrigerant compression device 3 shuts down to await a subsequent demand from the control center 34. Immediately after such shutdown, the bleeder port of the regulating device 59 equalizes the pressure differential in the system 1.

Upon changing the mode of the system 1 from heating to cooling, the refrigerant compression device 3 may encounter some internal resistance to flow of the refrigerant 5 through the system 1 due to a portion of the refrigerant 5 in the liquid phase residing in the tubes 91 or 92 of the subterranean heat exchanger 11, this characteristic being more prevalent near the later portion of a heating season when the earth surrounding the subterranean heat exchanger 11 has experienced some cooling due to the extraction of heat energy therefrom. Because of such inertial resistance, the refrigerant compression device 3 may experience a prolonged, reduced pressure at the inlet port 19 thereof.

To prevent a premature shutdown of the refrigerant compression device 3 and to permit sufficient time to allow the refrigerant compression device 3 to overcome such inertial resistance, the low pressure bypass mechanism 131 postpones the automatic shutdown signal. If the inertial resistance has not been overcome within a pre-set period of time, approximately eight minutes for example, the refrigerant compression device 3 does shut down. After a relatively short delay, approximately ten minutes for example, the bypass mechanism 131 is adapted to alternately conduct a plurality of start-ups and shut-downs in an attempt to overcome the inertial resistance before permanently shutting down the compressor 3 until serviced. Alternatively, a microprocessor and associated circuitry may be utilized to control the number and timing of such attempts to overcome such inertial resistance.

When the control center 34 signals a demand for cooling, the system 1 changes to a cooling mode by switching the reversing valve assembly 9 to the cooling configuration 33. In the cooling mode, routing of the refrigerant 5 through the refrigerant compression device 3 and the portion of the system 1 situated between the refrigerant compression device 3 and the reversing valve assembly 9 is substantially the same as the routing of the refrigerant 5 during the heating mode. However, routing of the refrigerant 5 through the remainder of the system 1 during the cooling mode is in the opposite direction from that of the heating mode.

Specifically, the gaseous refrigerant 5 leaving the refrigerant compression device 3 is directed by the reversing valve assembly 9 from the reversing valve inlet port 23 to the energy reservoir port 25 where the refrigerant 5 is routed into the subterranean heat exchanger 11 and/or the ambient-air heat exchanger 13—alone, serially, or in parallel—as desired. The pressure of the refrigerant 5 entering the exchangers 11 and 13 during the cooling mode ranges between 175 to 275 psi, preferably 200 to 250 psi.

As the refrigerant 5 traverses the tubes 91 or 92, which are in thermal communication with the earth, the refrigerant 5, which has a temperature which is now elevated above that of the earth surrounding the tubes 91 or 92, transfers thermal energy to the earth by heat conduction through walls of the tubes 91 or 92. As such thermal energy is transferred, the gaseous refrigerant 5 condenses into a liquid. As previously described, the length and diameter of each of the tubes 91 or 92 is such that the refrigerant 5 entering the exchanger 11 is substantially converted to a liquid while the refrigerant 5 is passing therethrough. The magnitude of mass of the refrigerant 5 flowing through the tubes 91 or 92 is such that must generate sufficient velocity of the refrigerant 5 is generated whereby any of the lubricant oil 75 contained in the refrigerant 5 will be swept along with the refrigerant 5 as aforedescribed.

As more and more thermal energy is dissipated in the earth in the vicinity of the tubes 91, more and more of the refrigerant 5 would fail to be liquified but for the cooperative assistance of the ambient-air heat exchanger 13. Thus, as the cooling season advances, greater and greater reliance is placed upon the ambient-air heat exchanger 13 to maintain desired overall efficiency of the system 1. Otherwise a system utilizing only the subterranean heat exchanger 11 would have to be oversized in order to satisfy the thermal energy demands during the latter portions of the heating and cooling seasons.

When the refrigerant 5 exits from the exchangers 11 and 13 and enters the expansion valving assembly 15, the refrigerant 5 is prevented from passing through the heating mode leg 51 by the check valve 57. Instead, the refrigerant 5 passes through the check valve 61 and the cooling mode flow regulating device 63 of the cooling mode leg 53 of the expansion valving assembly 15. As the liquid refrigerant 5 passes through the regulating device 63, the flow rate of the refrigerant 5 is controllably regulated while it undergoes a substantial drop in pressure. The magnitude of the drop in pressure is selected such that the effective temperature of the refrigerant 5 is reduced substantially below the temperature of the receiving medium 135 passing through the dynamic load heat exchanger 17.

Upon exiting the expansion valving assembly 15, the liquid refrigerant 5 is routed through the dynamic load heat exchanger 17. As the refrigerant 5 flows through the dynamic load heat exchanger 17, it absorbs heat energy from and cools the receiving medium 135. The cooled receiving medium 135 can then be used for other purposes, either locally or remote from the exchanger 17.

As the refrigerant 5 passes through the exchanger 17, the absorption of heat energy from the receiving medium 135 causes the refrigerant 5 to generally undergo a transition from the liquid phase to the gaseous phase.

The monitoring device 65 monitors the temperature and/or pressure of the gaseous refrigerant 5 after it exits the heat exchanger 17 and is enroute to the reversing valve assembly 9. The output from the device 65 is adapted to control the flow of refrigerant 5 to the exchanger 17 by modulating the regulating device 63 in response to such pressure and temperature measurements supplied by the monitoring device 65 by methods commonly known in the industry.

The refrigerant storage device 111 performs another very important function. The internal volume of the dynamic load heat exchanger 17 for containing the refrigerant 5 is generally substantially smaller than the corresponding volume of the exchangers 11 and 13. Thus, as the system 1 reverses from the heating mode to the cooling mode, or vice versa, either a requirement to remove substantial excess refrigerant 5, or a requirement to provide substantial additional refrigerant 5, is placed on the system 1. The capacity of the refrigerant storage device 111 is adapted to automatically serve as a source for supplying the additional refrigerant 5 and to also serve as a sink for absorbing the excess refrigerant 5 during such system reversals.

It is to be understood that while certain forms of the present invention have been illustrated and described herein, it is not to be limited to the specific forms or arrangement of parts as shown.

What is claimed and desired to be secured by Letters Patent is as follows:

1. An apparatus comprising:
  a) a first refrigerant-based heat exchanger adapted to directly absorb thermal energy from the earth as said apparatus operates in a heating mode, and to transfer thermal energy to the earth as said apparatus operates in a cooling mode;
  b) a second refrigerant-based heat exchanger adapted to directly absorb thermal energy from the ambient atmosphere as said apparatus operates in said heating mode, and to transfer thermal energy to said ambient atmosphere as said apparatus operates in said cooling mode;
  c) a dynamic load heat exchanger adapted to utilize thermal energy received from said first and second heat exchangers as said apparatus operates in said heating mode, and to transfer thermal energy to said first and second heat exchangers as said apparatus operates in said cooling mode;
  d) a refrigerant distribution system, with refrigerant, connecting said first and second heat exchangers and said dynamic load heat exchanger in flow communication with each other;
  e) a refrigerant compression device adapted to cycle said refrigerant through said refrigerant distribution system, said first and second heat exchangers, and said dynamic load heat exchanger;
  f) control means for controlling the magnitude of thermal energy transferred by said second heat exchanger relative to the magnitude of thermal energy transferred by said first heat exchanger;
  g) a reversing valve for converting said apparatus from one of said heating and cooling modes to the other of said modes; and
  h) a regulating assembly for regulating the flow of said refrigerant through said apparatus.

2. The apparatus according to claim 1 wherein said first heat exchanger includes a single, substantially horizontally oriented tube.

3. The apparatus according to claim 2 wherein said refrigerant compression device is adapted to cycle sufficient refrigerant such that at least 2½ pounds of said refrigerant passes through said tube per minute.

4. The apparatus according to claim 2 wherein said refrigerant compression device is adapted to cause said refrigerant to flow through said tube at a velocity of at least 25 feet per minute.

5. The apparatus according to claim 1 wherein said first heat exchanger includes a plurality of tubes, each substantially horizontally oriented.

6. The apparatus according to claim 5 wherein said refrigerant compression device is adapted to cause said refrigerant to flow through each of said tubes at a velocity of at least 25 feet per minute.

7. The apparatus according to claim 5 wherein said refrigerant compression device is adapted to cycle sufficient refrigerant such that at least 2½ pounds of said refrigerant passes through each of said tubes per minute.

8. The apparatus according to claim 5 wherein said apparatus has one of said plurality of tubes for each 12,000 B.T.U. of capacity of said apparatus.

9. The apparatus according to claim 1 wherein said first heat exchanger includes a substantially vertically oriented tube.

10. The apparatus according to claim 9 wherein said first heat exchanger is installable in a bore hole.

11. The apparatus according to claim 1 wherein said first heat exchanger includes a tube having a substantially vertically oriented portion and an inclined portion.

12. The apparatus according to claim 11 wherein said inclined portion has a spiral configuration.

13. The apparatus according to claim 11 including a reversing valve such that said refrigerant is directed through said substantially vertically oriented portion prior to being directed through said inclined portion during both said heating and cooling modes.

14. The apparatus according to claim 11 wherein said first heat exchanger is installable in a bore hole.

15. The apparatus according to claim 1, wherein said system includes device means for determining whether said refrigerant substantially undergoes a phase change as said refrigerant transits said first heat exchanger.

16. The apparatus according to claim 15 wherein said device means is a pressure monitoring device.

17. The apparatus according to claim 15 wherein said device means is a sight glass.

18. The apparatus according to claim 15 wherein said device means is an electronic sight glass connected in communication with said control means such that activation of said second heat exchanger is automatically responsive thereto.

19. The apparatus according to claim 1 including at least one preheat exchanger.

20. The apparatus according to claim 19 including valve means adapted to selectively bypass said at least one preheat exchanger.

21. The apparatus according to claim 1 including a receiver device adapted to store any excess of said refrigerant contained in said apparatus as said apparatus operates in said heating mode.

22. The apparatus according to claim 21 wherein said receiver device has sufficient capacity to store approximately twenty percent of said refrigerant contained in said apparatus.

23. The apparatus according to claim 21 wherein said receiver device includes a baffle adapted to minimize turbulence therein as said apparatus operates in said heating mode.

24. The apparatus according to claim 1 wherein said regulating assembly includes a first leg for conveying said refrigerant as said apparatus is operating in said heating mode and a second leg for conveying said refrigerant as said apparatus is operating in said cooling mode.

25. The apparatus according to claim 24 wherein each of said first and second legs includes a check valve and a regulating device.

26. The apparatus according to claim 25 wherein each of said regulating devices has a 20–25% bleed port.

27. The apparatus according to claim 24 wherein said refrigerant downstream from said regulating assembly has a pressure of approximately 30–90 psi.

28. The apparatus according to claim 24 wherein said refrigerant downstream from said regulating assembly has a pressure of approximately 50–70 psi.

29. The apparatus according to claim 1, including a refrigerant storage device.

30. The apparatus according to claim 29 wherein said refrigerant storage device has sufficient capacity to store approximate fifty percent of said refrigerant contained in said apparatus.

31. The apparatus according to claim 1 wherein said distribution system includes valve means adapted to operate either of said first and second heat exchangers alone.

32. The apparatus according to claim 1 wherein said distribution system includes valve means adapted to connect said first and second heat exchangers serially.

33. The apparatus according to claim 1 wherein said distribution system includes valve means adapted to connect said first and second heat exchangers in parallel.

34. The apparatus according to claim 1 wherein said distribution system includes valve means adapted to selectively operate said first and/or second heat exchanger alone, serially or in parallel.

35. The apparatus according to claim 1 wherein said regulating assembly includes a bi-directional regulating device.

36. The apparatus according to claim 1 wherein said control means are adapted to deactivate said second heat exchanger in the event that ambient air about said second heat exchanger falls below a preset temperature.

37. A heating and cooling system comprising:
a) a refrigerant-based, subterranean heat exchanger having a tube for each 12,000 B.T.U. of heat transfer capacity of said system;
b) a refrigerant-based ambient-air heat exchanger, wherein said ambient-air heat exchanger is adapted to operate in concert with said subterranean heat exchanger such that both are concurrently operable either as sources of thermal energy for, or as sinks for dissipation of thermal energy from, said system;
c) a dynamic load heat exchanger adapted to receive thermal energy from, and to transfer thermal energy to, said subterranean and ambient-air heat exchangers;
d) a refrigerant distribution system, with refrigerant, interconnecting said subterranean and ambient-air heat exchangers, and said dynamic load heat exchanger in flow communication with each other;
e) a compressor adapted to cycle said refrigerant through said refrigerant distribution system, said subterranean and ambient-air heat exchangers, and said dynamic load heat exchanger; said compressor adapted to cycle at least 2½ pounds of said refrigerant through each said tube per minute; said compressor adapted to cycle said refrigerant through each said tube at a velocity of at least 25 feet per minute;
f) a reversing valve adapted to convert said system from one of said heating and cooling modes to the other of said modes;
g) a regulating assembly having a heating mode leg and a cooling mode leg; each of said heating and cooling mode legs having a check valve and a regulating device such that said refrigerant flows through said heating mode leg and is prevented from flowing through said cooling mode leg as said system operates in said heating mode, and such that said refrigerant flows through said cooling mode leg and is prevented from flowing through said heating mode leg as said system operates in said cooling mode; each of said regulating devices having a 20–25% bleed port; said regulating assembly adapted to cause said refrigerant downstream therefrom to have a pressure of approximately 30–90 psi;
h) an accumulator adapted to store excess said refrigerant; said accumulator having sufficient capacity to contain approximate fifty percent of total said refrigerant in said system;
i) a first monitoring device adapted to determine failure of said refrigerant to substantially undergo a phase change as said refrigerant transits said subterranean heat exchanger;
j) a control center adapted to selectively activate said ambient-air heat exchanger in response to a signal from said first monitoring device; said control center further adapted to deactivate said ambient-air heat exchanger as the ambient temperature about said ambient-air heat exchanger is below a preset temperature;
k) a second monitoring device adapted to monitor said refrigerant exiting from said dynamic load heat exchanger as said system operates in said heating mode; said second monitoring device, in conjunction with said control center, further adapted to control said regulating device of said cooling leg in response to condition of said refrigerant exiting from said dynamic load heat exchanger;
l) a bypass mechanism adapted to alternatively conduct a plurality of start-ups and shut-downs of said compressor; and m) a lost charge device adapted to detect substantial loss of said refrigerant from said system; said lost charge device further adapted to override said bypass mechanism and to deactivate said system.

* * * * *